US006920447B2

(12) United States Patent
Pudipeddi et al.

(10) Patent No.: US 6,920,447 B2
(45) Date of Patent: Jul. 19, 2005

(54) CONCURRENT DATA RECALL IN A HIERARCHICAL STORAGE ENVIRONMENT USING PLURAL QUEUES

(75) Inventors: Ravisankar Pudipeddi, Redmond, WA (US); Ran Kalach, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 09/783,820

(22) Filed: Feb. 15, 2001

(65) Prior Publication Data

US 2002/0111929 A1 Aug. 15, 2002

(51) Int. Cl.[7] .............................................. G06F 17/30
(52) U.S. Cl. ..................... 707/3; 707/4; 707/8; 707/10; 707/101; 707/102; 707/104.1; 707/201
(58) Field of Search .............................. 707/1, 4, 8, 10, 707/101, 102, 104.1, 201, 9, 202, 203, 204, 2, 100; 370/230, 232, 353, 398; 709/201, 202, 231, 230, 102, 104, 206, 213, 216, 224, 236, 240, 245, 250; 711/133, 145, 112, 151, 161, 100, 119, 136, 147, 154; 369/191

(56) References Cited

U.S. PATENT DOCUMENTS

| | | | | |
|---|---|---|---|---|
| 6,072,766 A | * | 6/2000 | Konshak | 369/192 |
| 6,178,519 B1 | * | 1/2001 | Tucker | 714/4 |
| 6,272,605 B1 | * | 8/2001 | Le et al. | 711/151 |
| 6,279,074 B1 | * | 8/2001 | Pence | 711/112 |
| 6,378,036 B2 | * | 4/2002 | Lerman et al. | 711/112 |
| 6,490,666 B1 | * | 12/2002 | Cabrera et al. | 711/161 |

OTHER PUBLICATIONS

Microsoft Computer Dictionary, Fifth Edition, p. 332.*
Hurley, R.T., et al., "File Migration and File Replication: A Symbiotic Relationship," *IEEE Transactions on Parallel and Distributed Systems* Jun. 1996, 7(6).
Klostermeyer, W., "Scheduling Process and File Migrations in a Distributed System," *Sixth Annual Conference on Parallel and Distributed Computing Systems*, Kumar, A. et al. (Eds.), 1993, 9–13.
Cordrey, V., et al., "Moving Large File Systems On–Line, Including Existing HSM Filesystems," *13th Systems Administration Conference (LISA '99)*, 1999, 187–96.
Rothwell, P., "Storage Capacity Problems and Solutions," *Network Computing*, Oct. 1995, 4(10), 34–37.
Colwell, S., "The World of Hierarchical Storage Management," *BYTE*, Aug. 1996, 21(8).
Transcription of Dialog Web Abstract for Clark, A., "Hierarchical Storage Management," Network News (UK Edition) , May 1998.

* cited by examiner

*Primary Examiner*—Shahid Alam
*Assistant Examiner*—Fred I. Ehichioya
(74) *Attorney, Agent, or Firm*—Woodcock Washburn LLP

(57) ABSTRACT

A technique for recalling data objects stored on media. A queue is created for each medium on which data objects are located, where each request to recall a data object is placed on the queue corresponding to the medium on which the data object is located. A queue is "active" when its corresponding medium is mounted and being used for recall; otherwise the queue is "non-active." A thread is created for each active queue, where the thread retrieves from a medium the requested items on the active queue. When plural drives are available for mounting and reading media, plural queues may be active concurrently, so that the plural queues' respective threads may recall items from the plural media in parallel. Preferably, the requests on each queue are organized in an order such that the offset locations of the requested items form two monotonically increasing sequences.

20 Claims, 10 Drawing Sheets

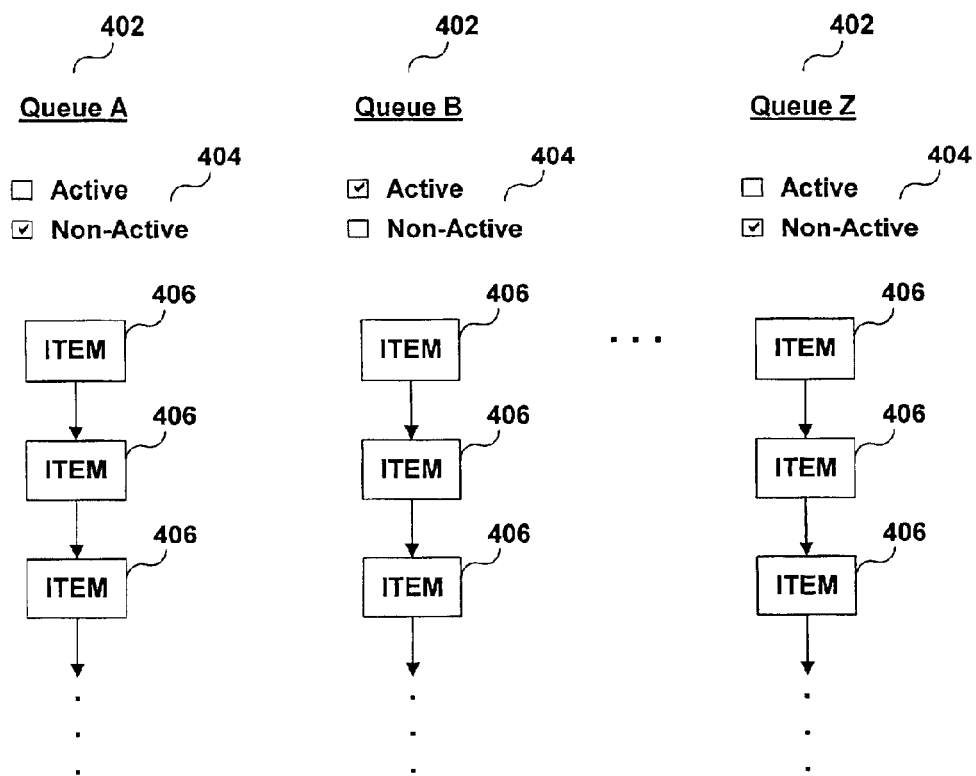
*FIG. 4A*
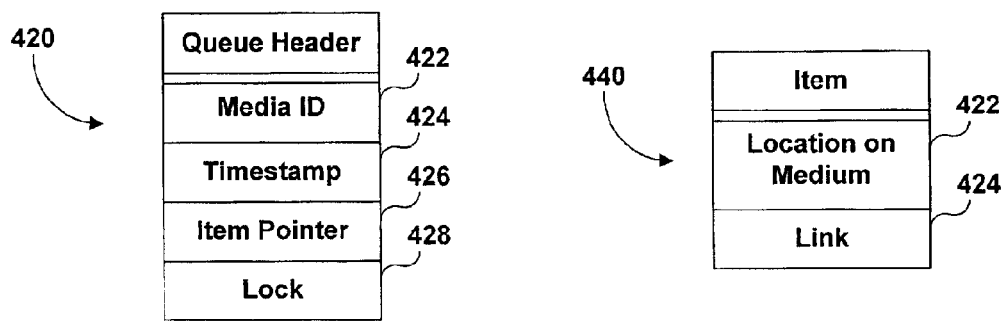
*FIG. 4B*     *FIG. 4C*

CONCURRENT DATA RECALL IN A HIERARCHICAL STORAGE ENVIRONMENT USING PLURAL QUEUES

FIELD OF THE INVENTION

This invention relates generally to the field of computing and, more particularly, to a system and method for recalling data objects stored on media such as tapes or removable disks.

BACKGROUND OF THE INVENTION

In computing systems that employ a mass storage device (such as a hard disk) for the storage of data objects (e.g., files), it is often the case that data objects stored on the mass storage device are "migrated" to backup media (e.g., tape, writeable optical disk, etc.) in order to make room for new data in mass storage. When a data object has been migrated to backup media, it may become necessary to restore the object from the backup media—for example, if a user requests read or write access to a migrated object. When access to such a "migrated" objects is requested, it may be necessary to locate the backup media containing the object, and to mount the media on an appropriate drive in order to restore the object.

It is often the case that migrated data objects are distributed over several media (e.g., where data objects are files, files 1, 3, and 5 may be on tape 1, and files 2 and 4 may be on tape 2). Conventional systems generally place restore requests in a single queue and process these requests in the order received (i.e., first in, first out) without regard to where the data is located. Processing restore requests in this manner tends to lead to repetitive mounting and dismounting of media, as well as repeated traversal of the same media. In the above example, if files 1, 2, 3, 4, and 5 are requested in that order and only one drive is available, then tapes 1 and 2 must alternately be mounted and dismounted from the drive after each file is restored. Moreover, even if two objects reside on the same medium, they may be requested (and processed) in an order that differs from that in which they are located on the medium. In the case of a sequential medium such as a tape, this means that the tape may have to shuttle back and forth repeatedly in order to locate the requested items, thereby increasing wear and tear on the tape.

Additionally, it is usually the case that even if migrated objects reside on different media and plural drives are available, the objects are processed sequentially (i.e., one at a time) in the order in which they appear on a single queue. Restoring migrated objects in this manner is wasteful of resources, because one or more available drives may stand idle while data is retrieved from only a single drive.

The present invention overcomes the limitations and drawbacks of the prior art.

SUMMARY OF THE INVENTION

The invention provides a system and method for restoring data objects from backup media. Various objects to be restored may each reside on different media. When a migrated objects is requested, a database lookup is performed to determine on which medium the object is located. A queue is created for each medium that stores requested objects, and a request for a given object is placed in the queue corresponding to the object's host medium. Each queue may be either "active" or "non-active." A queue is "active" when its corresponding medium is mounted on a drive such that migrated files may be retrieved from that medium; otherwise, the queue is "non-active." An active queue is "processed" (i.e., the data objects on the queue are retrieved from the corresponding medium) until the queue is empty. Non-active queues wait until a drive becomes available, and are then processed in the same manner. New requests may be placed on both active and non-active queues.

The invention may be incorporated into a physical computing arrangement having more than one drive. In such a case, a number called the "concurrency" is defined, which is the number of drives that may be used concurrently to read backup media. Any number of queues—up to the concurrency number—may be active at a given point in time. When the number of active queues equals the concurrency number, this means that the maximum allowable number of media are mounted in drives and are being used to restore migrated files. The concurrency number may be equal to the number of physical drives available, or it may be less than the number of physical drives (e.g., in the case where the system administrator wants to reserve one or more drives for other uses). Preferably, when plural queues are active at the same time, the corresponding media are concurrently read from different drives, thereby increasing the throughput of the restoration process by allowing different backup media to be read at the same time.

It is preferable that items be placed on the queues in an order based on where the requested items are located on the corresponding medium, in order to minimize traversal of the medium. For example, when sequential media such as tapes are used (or other media whose storage locations are traversed in a pre-defined logical sequence), the queues can be organized in monotonically increasing sequences based on the requested data object's offset relative to a start position. If a newly requested item is located ahead of the current position of the tape head (i.e., the new item has not yet been encountered as the tape moves in the forward direction), it is placed on the queue in the first sequence; if a newly requested item is behind the tape head (i.e., the items position has already been encountered as the tape moves forward), then it is placed in the second sequence. Once the first sequence is exhausted, the tape can be rewound so that the second sequence can be started, thereby reducing repeated back-and-forth traversal of, and therefore wear and tear on, the tape.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4A is a block diagram showing a plurality of queues having requests to recall data objects from media in accordance with aspects of the invention;

FIG. 4B is a block diagram of an exemplary queue header data structure;

FIG. 4C is a block diagram of an exemplary queue item data structure;

OVERVIEW

Many computer systems include a hard disk, or other long-term storage device, as a primary means for long-term storage of files or other data. When the disk becomes full, it may be necessary to "migrate" certain data to a backup medium such as a tape or optical disk. When migrated data is needed by the computer system or its user, it is necessary to recall that data from the backup medium. The present invention provides an efficient technique for the recall of data from backup media.

Exemplary Computing Environment

Figure 1:
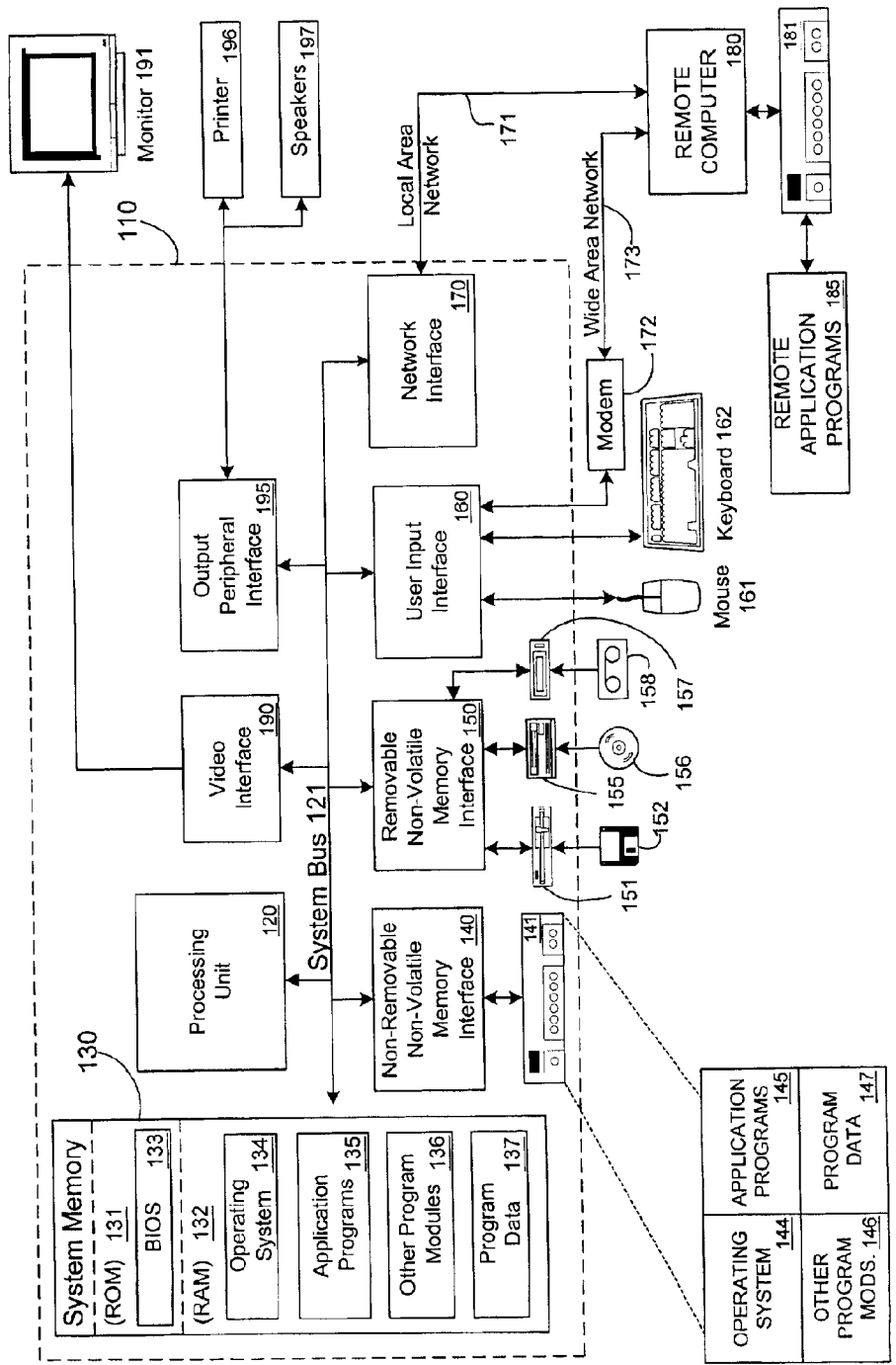
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, an optical disk drive 155 that reads from or writes to a removable, nonvolatile optical disk 156, such as a CD ROM or other optical media, and a sequential media drive 157 that reads from or write to a removable, nonvolatile sequential medium 158, such as a magnetic tape cassette or reel-to-reel tape. Other removable/non-removable, volatile/nonvolatile computer storage media that can be used in the exemplary operating environment include, but are not limited to, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Data Migration Environment

Figure 2:
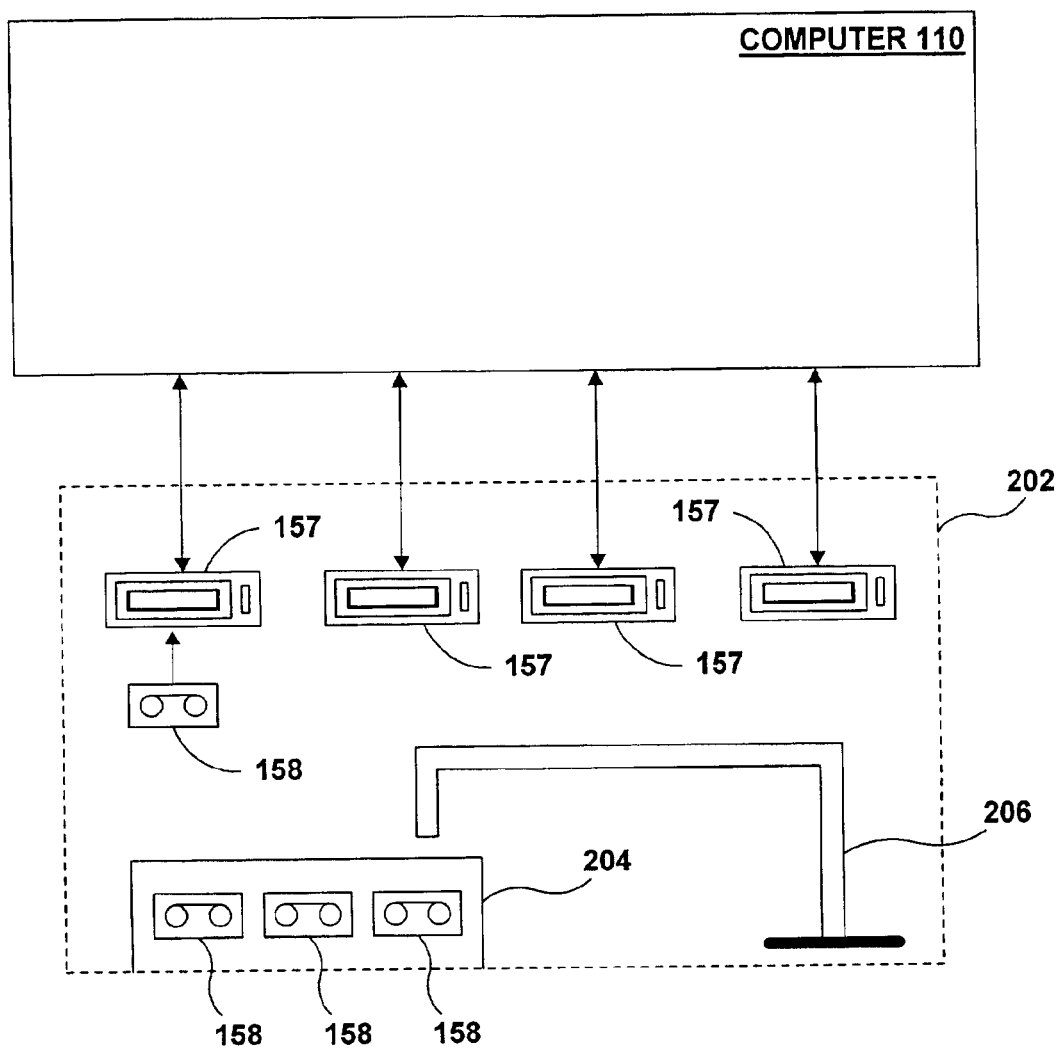
FIG. 2 is a block diagram of an exemplary data migration environment having a computing device communicatively connected to one or more media drives.

FIG. 2 shows an exemplary environment in which migrated data may be stored on backup media. Computer 110 may be communicatively connected to one or more media drives. FIG. 2 shows computer 110 connected to a plurality of media drives 157, which are capable of reading data from media 158 and communicating that data back to computer 110. FIG. 2 depicts media drives 157 and media 158 as tape drives and magnetic cassette tapes, respectively. Tape media, however, is merely exemplary and is not limiting of the invention. The environment shown in FIG. 2 could, as an alternative example, include magnetic disk drives 151 for use with magnetic disks 152 (shown in FIG. 1), optical disk drives 155 for use with optical disks 156 (also shown in FIG. 1), or any other type of media-reading device for use with appropriate data storage media.

Media drives 157 are preferably configured to work with "removable" media, such that a given medium 158 can be mounted or dismounted from drive 157. A media drive 157 may, at any given time, have a particular medium 158 mounted on it, or it may be "empty" (i.e., no medium 158 presently mounted on the drive). By way of example, FIG. 2 shows one media drive 157 (the leftmost media drive 157 in FIG. 2) having a medium 158 mounted thereon, and three other media drives 157 have no media mounted thereon.

Media drives 157 may be included within, or may be associated with, a "juke box" 202. Juke box 202 stores a library 204 of media 158 in a "near-line" position such that media 158 in library 204 can be mounted and dismounted by machine without human intervention. Juke box 202 includes robotic arm 206, which mounts media onto (and dismounts media from) media drives 157. While juke box 202 is a convenient device for storing, mounting, and dismounting media 158, juke box 202 is optional, and the invention applies to any environment having one or more media drives 157, whether or not media drives 157 or media 158 are associated with juke box 202.

Media 158 are generally used to store "migrated" data. In a typical example, media 158 are used to store files that have been "migrated" (i.e., moved off of) a primary storage device (such as hard disk 141 shown in FIG. 1) in order to free up space for new data on the primary storage device. For example, a storage management program on computer 110 (which may, for example, be part of operating system 134) may target files on hard disk 141 that have not been accessed for some predetermined period of time (e.g., six months). The targeted files may be migrated to media 158 by deleting the files from hard disk 141 and copying them to one or more media 158. A "stub" that identifies the new location of each file may be retained on hard disk 141 so that the file can be located later. While old or rarely-used files are a common type of data that are stored on media 158, it should be understood that such files are not limiting of the invention. Rather, the invention may be used to recall any type of data that may be stored on media 158, regardless of whether the data is organized into files, and regardless of the reasons for which the data has been stored on media 158.

Exemplary Organization of Data Objects on a Medium

Figure 3:
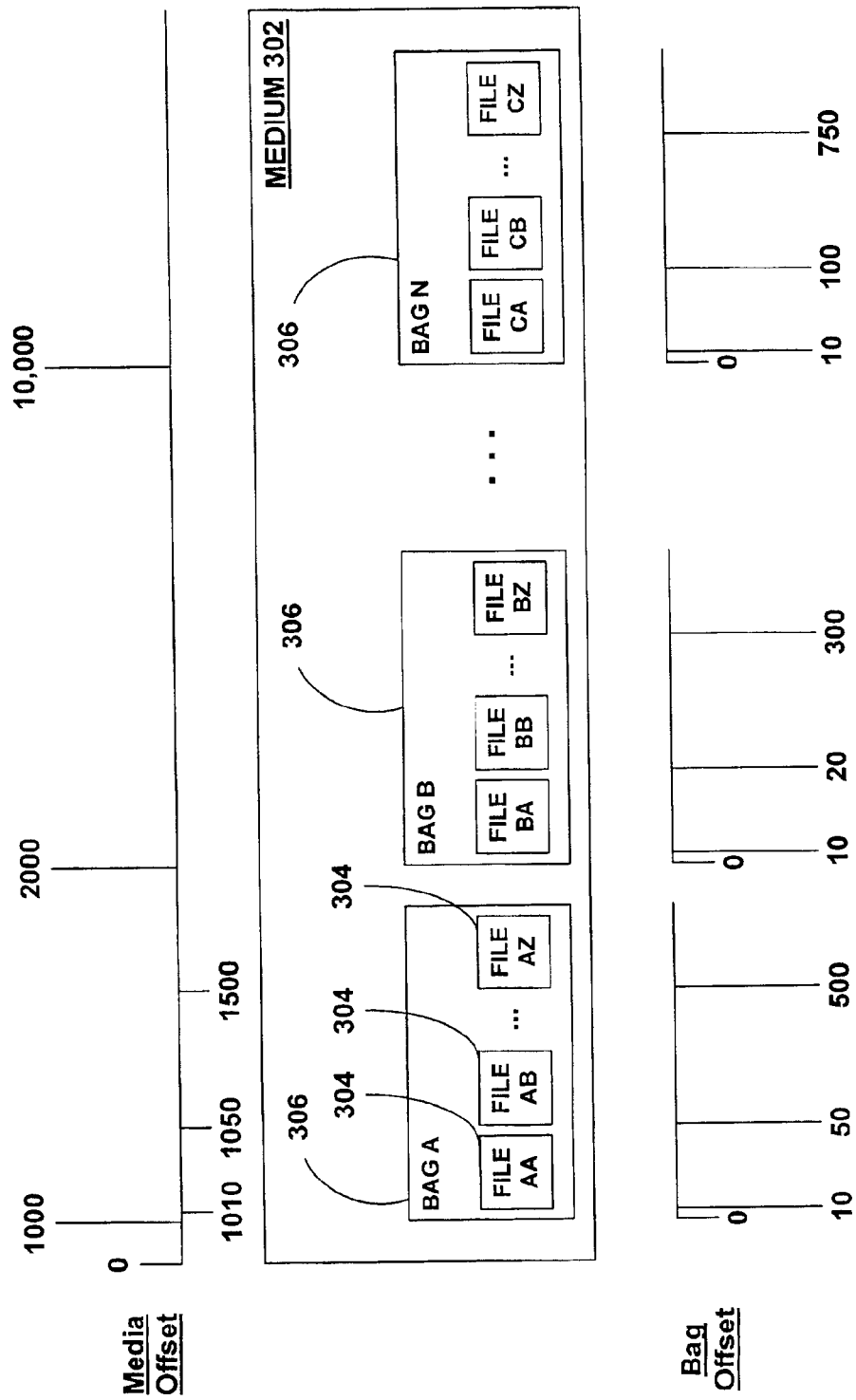
FIG. 3 is a block diagram showing an exemplary organization for data objects stored on a medium.

FIG. 3 depicts an example organization of data on a medium 302. Medium 302 could be any type of medium, such as tape 158, optical disk 156, or magnetic disk 152 (all shown in FIG. 1). In this example, medium 302 stores files 304, although it should be appreciated that a file is merely an exemplary type of data object, and medium 302 could store any type of data objects. As noted above, files 304 may, for example, be files that were once resident on a hard disk (e.g., hard disk 141 shown in FIG. 1) but that have been "migrated" to medium 302 in order to free up space on the hard disk. It may be convenient to group files 304 into "bags" 306 for storage on medium 302. Essentially, a "bag" is an arbitrary grouping of files that are stored together. As one example, the files 304 in a given bag 306 may represent all files from a particular volume of hard disk storage that were migrated at a particular time. Thus, if the migration process is performed nightly, then each bag 306 may represent all of the files from a given volume that were collected in a given night (e.g., all files from volume C: that were migrated on Jan. 1, 2000). It should be understood that the organization of data objects into bags 306 is merely for convenience, and data objects could, alternatively, be stored individually on medium 302 without grouping those data objects into bags 306.

The storage locations in medium 302 may have a one-dimensional linear order. That is, every storage location on medium 302 may be described by a single-number offset from a starting position. This order may be implemented physically, as in the case of sequential media such as tapes where the offset represents essentially the linear distance from the start of the tape. Alternatively, the order may be implemented "logically," as in the case of a magnetic disk in which an arbitrary "start" point is defined on each track, and in which the tracks are traversed in a predefined sequence, thereby defining an order for the entire set of storage locations on the disk. Thus, as shown in FIG. 3, every file 304 is shown as starting at a location that is described by its offset from the "beginning" of the medium, whether that "beginning" is a physical or logical beginning. In FIG. 3, the beginning of the medium is defined as offset zero. File AA begins at offset 1010, file AB begins at offset 1050, and so on. Moreover, each bag 306 can be described as beginning at a particular offset into medium 302: bag A begins at offset 1000, bag B begins at offset 2000, and so on. Thus, if the starting offset for each bag is known, a file's offset into medium 302 can be described by the identity of the bag 306 in which it is located and the file's offset into the bag. For example, file AA is in bag A, and has offset 10 into bag A. Thus, adding 1000 (the bag's offset into the medium) together with 10 (the file's offset into the bag), produces the absolute offset (1010) of file AA into the medium.

Recall Technique: Establishing a Recall Queue for Each Medium

It will be appreciated that files 304 (or other data objects to be recalled) may be stored on various different media 302—i.e., a first set of files may be stored on a first medium, and a second set of files may be stored on a second medium. Requests to recall these files may be received in any order. While the requests may be processed sequentially in the order in which they are received, doing so has the disadvantages that (1) it may fail to exploit the time efficiency that could be achieved by using plural drives to recall concurrently those data objects that are located on different media 302; and (2) it may cause repetitive mounting and dismounting of media 302, and shuttling back and forth across the same medium, as requests are processed in an order that has nothing to do with where the data objects are located. The technique of the present invention schedules recall requests in a more advantageous manner.

In accordance with the invention, a queue is established for each medium 302 that contains a requested file 304 (or other data object). A request for a given data object is placed on the queue that is associated with the medium on which that object is located. Each queue is then processed to retrieve all of the items on the queue from the medium associated with the queue. At any given time, a queue may be classified as either "active" (i.e., the associated medium is presently mounted on a drive and items on the queue are being recalled from that medium), or "non-active" (the items on the queue are not presently being recalled from the associated medium).

FIG. 4A shows an example set of queues 402 corresponding to a plurality of different media 302. For example, queue A corresponds to medium A, queue B corresponds to medium B, etc. Each queue 402 has one or more items 406 associated therewith. Each item 406 represents a request to retrieve a data object (e.g., file 304) from the medium that corresponds to the queue. For example, all of the items 406 on queue A represent requests to retrieve data objects that are located on medium A. Similarly, the items 406 on queue B represent requests to retrieve data objects that are located on medium B. Preferably, items 406 are stored within a queue 402 as a linked list, or another data structure that stores items 406 in an identifiable sequence within a queue. As further discussed below in connection with FIGS. 8A–9, certain techniques may be used to optimize the order in which items are placed in the queue.

Each queue has a status 404 associated with it, which can be either active or non-active. In the example of FIG. 4A, queue B is active and queues A and Z are non-active. Queue B's active status indicates that medium B is presently mounted on a drive and is being used to recall the data objects indicated by the items 406 on queue B. The inactive status of queues A and Z indicates that media A and Z are not presently being used to recall the data objects indicated by the items 406 on those queues. For example, queues A and Z may be inactive because there is no available media drive onto which to mount media A and/or Z. As another example, media A and/or Z may be presently mounted elsewhere and being used for a different purpose, or may be stored off-line such that they are not available for mounting.

Each queue 402 may be represented by a queue header. FIG. 4B shows an exemplary queue header data structure 420. The exemplary data structure includes a media identifier 422, a timestamp 424, a list pointer 426, and a lock 428.

Media identifier 422 identifies the particular medium to which the queue 402 corresponds. With reference to the example of FIG. 4A, media identifier 422 could be "A", thereby indicating that the requests in the queue 402 defined by queue header 420 are requests for data objects located on medium A. In general, media identifier 422 is usually a number or character string that identifies the medium.

Timestamp 424 represents the time at which the queue 402 was created. As further discussed below, when it is necessary to choose a non-active queue 402 to activate, it may be advantageous to activate the oldest non-active queue 402 first. Timestamp 424 allows the oldest queue 402 to be identified.

Lock 428 is a read/write lock on queue 402. Each queue 402 has a lock 428. The per-queue lock is used for locking the queue while searching for the position to insert an item into the queue. Many items may arrive to the migration engine at the same time. However, the search for position and insertion of an item is protected by a lock in order to ensure that the item is inserted at the correct place in the queue. Lock 428 ensures that items are inserted in a given queue one at a time.

Item pointer 426 contains the address of the first item 406 in the queue. As noted above, items in the queue may be represented as a linked list. FIG. 4C shows an exemplary structure 440 for representing items 406 as a linked list. Linked list element structure 440 includes data 442 indicating the location on a medium 158 of a requested data object. Structure 440 also includes a link 444 to the next item 406 on the list. Link 444 preferably takes the form of a pointer to another linked list element structure 440. When items 406 are represented in this manner, then item pointer 426 in FIG. 4B is simply a pointer to the first linked list element structure 440 in the queue 402. However, it should be understood that items 406 could be represented by another type of data structure, such as an array. In such a case, item pointer 426 may contain the address of the beginning of the array.

Recall Technique: Placing a Request on One of a Plurality of Queues

Figure 5:
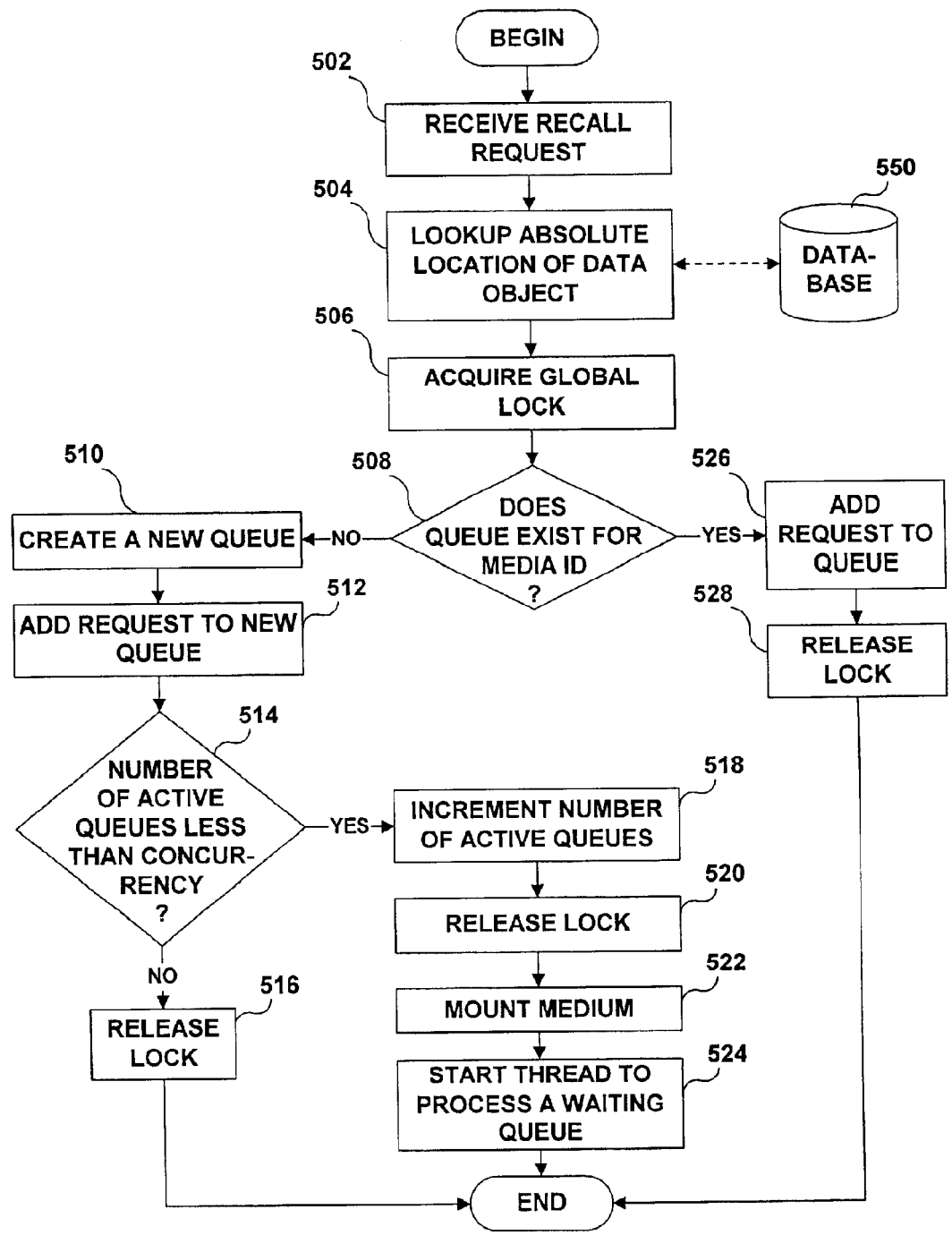
FIG. 5 is a flow diagram showing the process by which a recall request is queued.

With reference to FIG. 5, the procedure will now be described by which recall requests are queued for processing. First, a request to recall a data object (e.g., file 304) from media 302 is received (step 502). The request may take any format that identifies the requested data object. For example, the request may identify a particular data object by its bag ID, and its offset into the bag. However, the request may take any form that identifies the data object requested. For example, the request may specify the particular medium 302 (e.g., medium A in FIG. 4A) on which the requested data object is located and its absolute offset into that medium 158. The request received at step 502 may identify the requested data object in any manner without departing from the spirit and scope of the invention.

At step 504, the absolute location of the data object (i.e., its media ID and offset into the medium) is ascertained based on the identifying information in the request. For example, if the request identifies the data object by its bag ID and its offset into the bag, then step 504 may comprise converting that bag ID and offset into an absolute location. Such a conversion may, for example, be made by performing a database lookup in database 550. Database 550 contains the absolute locations of data objects stored on media 302, where those absolute locations are indexed by the identifying information in the request. For example, database 550 may contain entries indexed by bags IDs and bag offsets, such that absolute locations may be ascertained by submitting a query based on a bag ID and a bag offset. It should be understood that a lookup in database 550 is merely exemplary, and not limiting, of the manner in which the identifying information submitted at step 502 may be converted into an absolute location. Moreover, it should be understood that step 504 is optional and, under some circumstances, is not performed. For example, if the identifying information provided at step 502 comprises the absolute location of the requested data object, then step 504 may be omitted.

At step 506, a global lock is acquired. The global lock is a conventional resource lock that prevents concurrent performance of a class of actions. It will be understood by those skilled in the art that the step of acquiring the global lock may include waiting for the lock to become free if it is already owned by another thread. The use of a global lock prevents the set of existing queues from changing while the request received at step 502 is being queued, as further described below in connection with step 520.

At step 508, the set of existing queues 402 is examined, and it is determined whether a queue exists for the medium on which the requested data object is located. This action may be performed by examining the media ID field 422 in the queue headers 420 of all of the existing queues 402. If it is determined that such a queue exists, then the request received at step 502 is added to the appropriate queue (step 526), the lock is released (step 528), and the process terminates.

On the other hand, if it is determined at step 508 that no such queue exists, then a new queue is created at step 510. The creation of a new queue may be performed by creating a new queue header data structure 420, noting the time in timestamp field 424, and assigning the appropriate media ID to media ID field 422. The request received at step 502 is then added to the new queue at step 510.

When step 508 results in a determination that a new queue needs to be created, it must be determined whether a new queue should be activated. This determination is made at step 514 by determining whether the number of active queues (which may be maintained in a global counter) is less than a global value called the "concurrency." The concurrency is the maximum number of media that can be simultaneously used for recall, and thus is also the maximum number of queues that can be active at a given point in time. The concurrency is partly bounded by the physical parameters of the environment. Referring for the moment back to FIG. 2, it will be recalled that a system may have only a finite number of media drives 157 available to it. Since only one medium may be mounted on a media drive 157 at a given time, the number of media drives accessible to the system performing the recall is an upper limit on the concurrency. However, the concurrency may be a lower number, and may be user-specified. For example, the system administrator may decide that one drive should always be kept free for non-recall use, in which case he may set the concurrency at one less than the number of physical drives. For example, although FIG. 2 depicts computer 110 connected to four media drives 157, it may be the case that the system operator has designated only three of those drives for recall operations, and thus the concurrency in such a case would be three.

It should be observed that the number of queues that are active at a given time is usually not greater than the concurrency since (as more particularly discussed below) a new queue will only be activated when the number of presently active queues is less than the concurrency. However, it is possible in some cases for the number of active queues to exceed the concurrency when the concurrency is adjusted dynamically (e.g., by a system administrator) during the operation of the system. For example, if the concurrency is set to three, and three media are presently mounted on three different drives for recall of data objects, at some point during the recall operation a system administrator may lower the concurrency to two. In such a case, the presently active queues may be allowed to finish, but, until one queue completes processing, the number of active queues will be greater than the concurrency.

Returning now to FIG. 5, if it is determined at step 514 that the number of active queues is not less than the concurrency, then this means that the maximum number of queues is already active so no other queues can be activated. In this case, the global lock is released (step 516), and the process ends.

On the other hand, if it is determined at step 514 that the number of active queues less than the concurrency, then one of the inactive queues (i.e., the queue that was newly-created at step 510, or another inactive queue) can be activated. In order to activate a new queue, a counter that represents the number of presently active queues is incremented at step 518. Then, the global lock is released at step 520. At step 522, the medium corresponding to the queue is mounted on one of media drives 157. At step 524, a new "recall worker thread" (described in FIG. 6) is spawned in order to process the newly activated queue.

Recall Technique: Exemplary Recall Worker Thread

Figure 6:
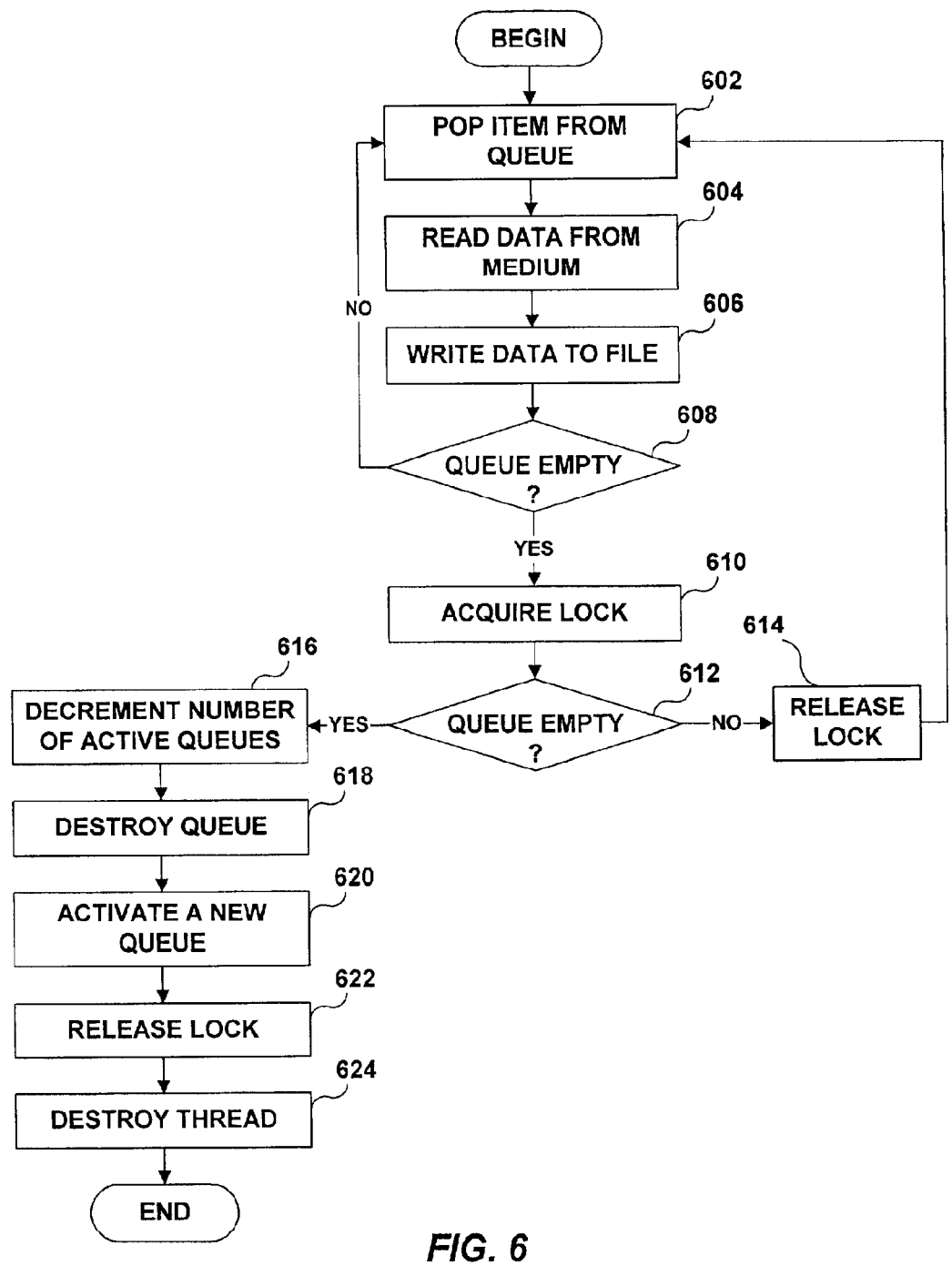
FIG. 6 is a flow diagram showing an exemplary process for a recall worker thread.

As previously noted, one advantage of the invention is the ability to concurrently recall data objects from different media when plural media drives are available. Concurrent recall is performed by establishing a separate "worker thread" for each active queue 402. The "worker thread" is established at step 524 in FIG. 5, or at step 716 in FIG. 7 discussed below. FIG. 6 shows an exemplary process for a "recall worker thread" established at one of the aforesaid steps.

Referring now to FIG. 6, at the start of the worker thread process the first item on the queue (e.g., item 406 in FIG. 4A) is popped from the top of the queue (step 602). The item is evaluated to determine the location on the medium of the next data object to be recalled. When the top item is popped from the queue, the next item on the queue becomes the top item.

At step 604, the data object identified by the popped item is read from the medium. At step 606, the data object that was read at step 604 is written to a target location. For example, if the data objects stored on the medium are migrated files, then the data read from the medium at step 604 may be written back onto a hard disk (e.g., hard disk 141 in FIG. 1) into space that is designated for the storage of the migrated file.

At step 608, it is determined whether the queue being processed by the worker thread is empty—that is, whether the last item has been popped off the queue. If the queue is not empty, the process returns to step 602, where the process heretofore is repeated for the next item on the queue. If the queue is empty, then the global lock is acquired at step 610, and the process continues to step 612.

At step 612, it is again determined whether the queue is empty. Although the queue has previously been tested at step 608 to determine whether it is empty, it is preferable to perform that test again due to the small chance that another thread may have placed another item on the queue after the test was last performed but before the lock was acquired—i.e., between steps 608 and 610. For example, a concurrently executing thread performing the queuing process depicted in FIG. 5 might have placed another item on the queue after step 608 is performed but before step 610 is performed. If the determination at step 612 is that the queue is not empty (i.e., has become non-empty since step 608), then the lock is released at step 614 and the process returns to step 602 to process the items that have been placed on the queue.

If step 612 results in a determination that the queue is still empty, then the counter that maintains the number of active queues is decremented (step 616). The counter decremented at step 616 is the same counter that is incremented at step 518 in FIG. 5. After decrementing the counter, the queue is destroyed (step 618). The exact manner in which the queue is destroyed depends on the manner in which the queue is represented. For example, if the queue is represented by a queue header 420 (shown in FIG. 4B), then destruction of the queue may be accomplished by deallocating the memory reserved for queue header 420.

Next, at step 620 a procedure is started to activate a new queue. An exemplary queue activation procedure is described below in connection with FIG. 7. It should be noted that step 620 does not necessarily result in the activation of a new queue, since there is a possibility that (1) the concurrency has been dynamically lowered since the last queue activation and thus the current number of active queues is equal to (or greater than) the present concurrency, or (2) there are no non-active queues waiting to be activated. Tests for these conditions are more particularly described below in connection with FIG. 7. Thus, step 620 results in an attempt to activate a new queue, and, depending upon conditions, may actually result in the activation of a new queue.

Following step 620, the global lock is released (step 622). Subsequently, the "recall worker thread" is destroyed at step 624, although it will be noted that a new "recall worker thread" may have spawned to replace it at step 620.

Exemplary Queue Activation Technique

Figure 7:
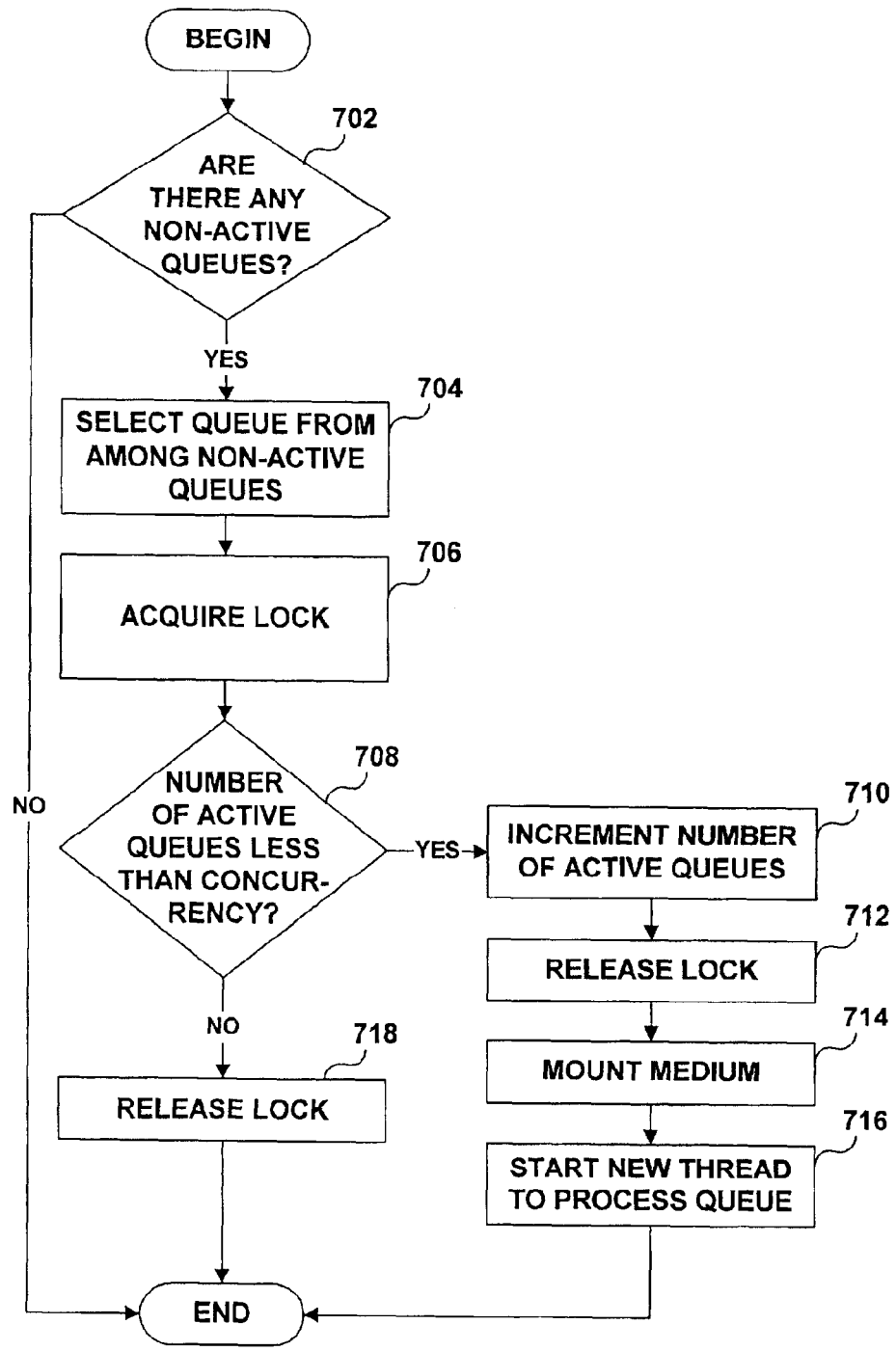
FIG. 7 is a flow diagram showing an exemplary queue activation technique.

FIG. 7 shows an exemplary process for activating a queue. The process shown in FIG. 7 is a essentially preferred method of performing step 620 (shown in FIG. 6).

At step 702, it is determined whether there are any non-active queues. If there are no non-active queues, then the process terminates. If there are non-active queues, then the process proceeds to step 704.

At step 704, a queue is selected from among the existing non-active queues. In the embodiment of the invention in which each queue has a timestamp as shown in FIG. 4B, it may be useful to select the queue having the oldest timestamp. However, it will be understood that such a selection paradigm is merely exemplary, and a queue may be selected at step 704 in any manner without departing from the spirit and scope of the invention. Once a queue is selected for activation, the global lock is acquired at step 706.

At step 708, it is determined whether the number of active queues is less than the concurrency. If the number of active queues is not less than the concurrency, then the process continues to step 718 to release the lock and the queue activation process ends without activating a queue. If the number of active queues is less than the concurrency, then the counter that maintains the number of active queues is incremented (step 710). The counter incremented at step 710 is the same counter referred to in step 518 (FIG. 5) and step 616 (FIG. 6). After the counter is incremented, the lock is released (step 712).

At step 714, the medium 158 corresponding to the queue 402 selected at step 704 is mounted on one of media drives 157. The mounting may be performed in any manner appropriate for the environment in which the recall takes place. For example, if juke box 202 is present (as shown in FIG. 2), then mounting the selected medium may be performed simply by instructing juke box 202 to mount the selected medium using robotic arm 206. Alternatively, if no juke box 202 is present, or if the selected medium is stored outside of the library 204 that is accessible to robotic arm 206, then mounting the selected medium may be performed by prompting a human operator to mount the medium.

At step 716, a new thread is started to process the activated queue. The started thread is a "recall worker thread," as depicted in FIG. 6. After the new "recall worker thread" is started, the queue activation process terminates.

Queue Optimization Technique

Referring back to step 512 in FIG. 5 wherein requests for items are placed on a queue 402, the requests may be placed on the queue in any order. For example, requests may be placed on the end of the queue in the order in which they are received without regard to the location on the medium of the requested data object. However, queuing of items in this manner has the disadvantage that it may cause the medium to shuttle back and forth across the reading head as data objects are accessed in an order that does not take into account where the data objects are located on the medium. The problem is particularly acute in the case of tape media, where such shuttling not only increases the amount of time required for recall operations but also increases wear on the tape. One way to improve performance is to place items on a queue such that the requests on the queue form up to two sequences, where each sequence increases monotonically with respect to the offsets of the requested data objects.

Figure 8A:
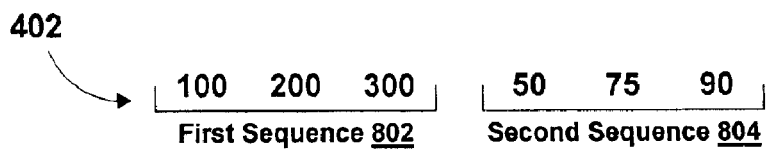
FIG. 8A is a diagram showing a queue having items to be recalled whose offsets form two monotonically increasing sequences.

FIG. 8A shows an example of items on a queue 402 organized into two monotonically increasing sequences. The queue represents requests for data objects on a particular medium, where there are six different requested data objects located at offsets 50, 75, 90, 100, 200, and 300. These requests are organized into a first sequence 802 and a second sequence 804. It will be observed that the items within a given sequence are always increasing with respect to their offsets. That is, for any item within a given sequence, the next item within that same sequence always has a larger offset. (It should be noted that a subset of each sequence (e.g., the sequence 100, 200) is also a "monotonically increasing sequence." However, as used herein the term "monotonically increasing sequence" refers to the largest such sequence—i.e., a sequence such that adding any of the adjacent items to the sequence would cause the sequence not to be monotonically increasing. Such a "largest" sequence can be described as a "maximal" monotonically increasing sequence.)

A purpose of using two monotonically increasing sequences is to address the situation in which a request for a data object is dynamically queued during the reading of the relevant medium, and where the reading head as already passed the newly-queued object's location on the medium. Essentially, the second sequence 804 represents a second "pass" through the medium that will be made to recall such dynamically-queued requests. Thus, instead of shuttling back and forth across the medium (which might happen if requests were placed on the queue in no particular order) the medium is traversed once in a single direction to process the requests in sequence 802, and then a second time to process the requests in sequence 804.

Figure 8B:
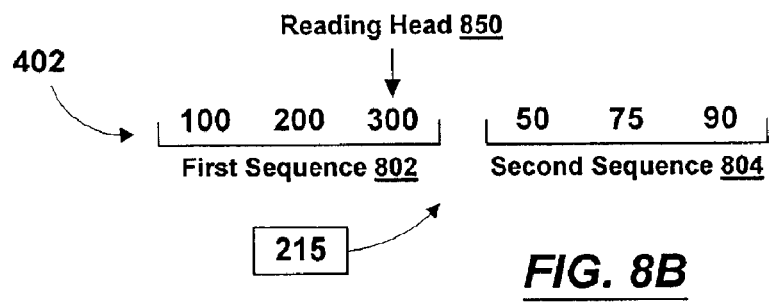
FIGS. 8B and 8C are diagrams showing the insertion of a new item into the second monotonically increasing sequence of the queue shown in FIG. 8A.
Figure 8C:
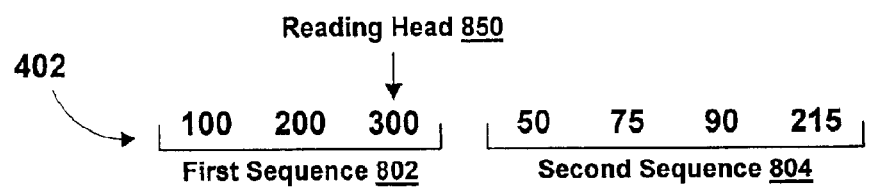

FIG. 8B shows an example of a circumstance in which a request is inserted into second sequence 804. Queue 402 depicted in FIG. 8B is the queue that corresponds to a given medium 158, and reading head 850 is positioned at offset 300 along medium 158. At that point in time, a new request is queued, and the request is for a data object located at offset 215 along medium 158. Because reading head 850 has already passed location 215 while making its pass through first sequence 802, the item is not queued in first sequence 802 but rather is placed in second sequence 804, as shown in FIG. 8C. It should be observed that the new item is positioned in second sequence 804 such that the increasing nature of the offsets in each sequence is maintained (in FIG. 8C, the new request having offset 215 is placed after the request for a data object located at offset 90).

Figure 8D:
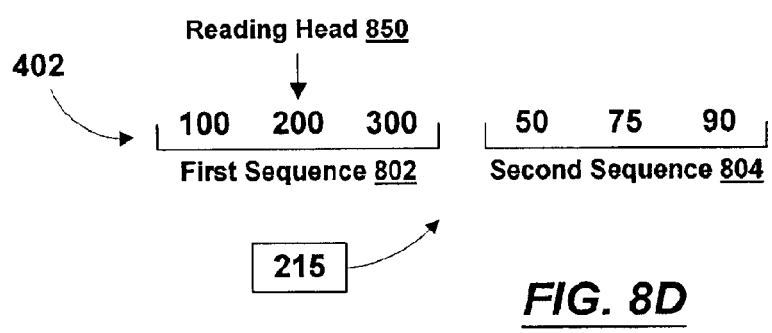
FIGS. 8D and 8E are diagrams showing the insertion of a new item into the first monotonically increasing sequence of the queue shown in FIG. 8A.
Figure 8E:
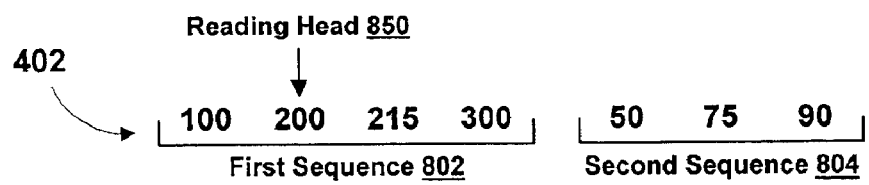

FIG. 8D shows an example of a circumstance in which a request is inserted into first sequence 802. In FIG. 8D, the new item to be queued is for a data object located at offset 215, as in FIG. 8B. Unlike FIG. 8B, however, FIG. 8D shows reading head 850 positioned at offset 200. Thus, the new item having offset 215 can be queued in first sequence 802 (as shown in FIG. 8E), because reading head 850 still has yet to pass over location 215 while making its pass through first sequence 802.

Figure 9:
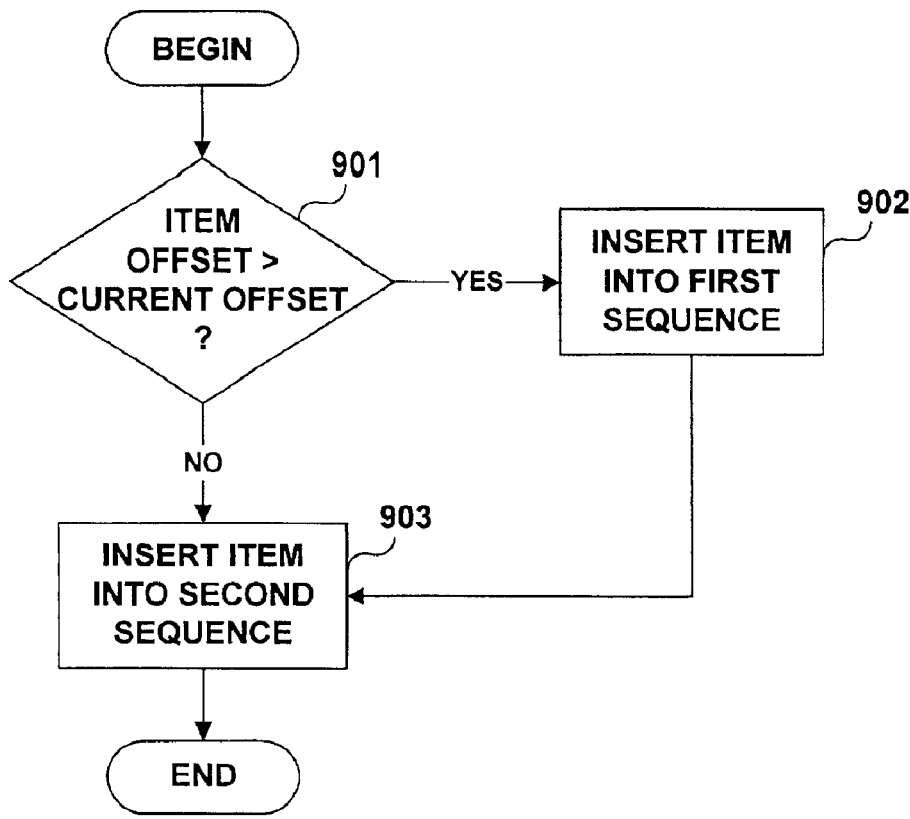
FIG. 9 is a flow diagram showing an exemplary queue optimization technique.

FIG. 9 shows the process of inserting a request into a queue that is organized into two monotonically increasing sequences, as described above. At step 901, a determination is made as to whether the offset of the requested data object into the medium is greater than the current offset of the reading head. When the medium is mounted, the current offset is equal to the actual position of the reading head along the medium. When the medium is not mounted, the current offset is set equal to zero. While a non-mounted medium is not technically positioned at any offset relative to the reading head, it may be viewed as being positioned at a zero offset. Since reading will commence at the starting position when such a medium is mounted, the entire content of the medium effectively lies ahead of the reading head, because when the medium is mounted reading will commence at the starting position. (A possible exception is cartridge tape media which can be dismounted while the tape is wound to any position, in which case the last known offset can be stored in a memory location.)

If step 901 results in a determination that the requested data object's offset into the medium is greater than the current reading head offset, then the request is inserted into the first sequence (step 902). The request is inserted into the sequence in such a position that the monotonic increasing nature of the sequence is preserved—i.e., after an item having a lower offset but before an item having a higher offset. If it is determined at step 901 that the offset of the requested item is less or equal to than the current reading head offset, then the item is inserted into the second sequence (step 903). After inserting the request into either sequence, the process terminates.

It should be observed that when a queue 402 is non-active (i.e., when reading of its corresponding medium 158 has not yet begun), all newly queued requests will be placed in a single sequence. This is so because there is no possibility that reading head 850 has passed the location of the newly-requested data object because reading of the medium has not even begun (except, as noted above, where a non-mounted cartridge tape is wound to a non-zero offset). In this sense, the situation in which items are added to a non-active queue is essentially equivalent to the situation in which reading head 850 is located at the beginning of the medium (i.e., at offset zero). Additionally, even if reading head 850 is not located at offset zero, if all incoming requests are located after the current position of reading head 850 then there will only be one sequence in the queue.

Additionally, it should be observed that the two monotonically increasing sequences in each queue are actually a series of monotonically increasing sequences that are being dynamically created and exhausted. For example, as a queue is being processed, its second sequence may begin to grow as new items, whose locations are behind the read head, are dynamically placed on the queue. Once the first sequence is exhausted, the first sequence no longer exists, because all items in the first sequence have been popped off the queue. At this point, the "second" sequence in effect becomes the first (and only) sequence in the queue. However, once processing of this sequence begins, new items may be dynamically queued that are behind the read head. These items are placed in a "new" second sequence. While this new sequence is the second sequence of items that are presently on the queue, it is historically the third sequence of items that have been created for the queue. However, since all of the items in the first historical sequence were popped off the queue during the first pass through the medium, the new sequence is the second sequence among those sequences that presently exist on the queue. Thus, the characterization of the queue as having two sequences refers to the state of the queue at any given point in time, rather than an historical description of what sequences have ever existed on the queue.

The Global Lock

It will be observed with reference to FIGS. 5–7 that a global lock is used (e.g., at steps 506, 520, 528, 610, 614, 622, 706, 712, and 718) in order to protect certain operations. Because any of the processes depicted in FIGS. 5–7 could be operating concurrently on different threads, the global lock is used to prevent errors that could result if two or more concurrent threads performed certain operations at the same time. The use of a lock guarantees that, even in a concurrent execution environment, certain classes of operations (i.e., those surrounded by locking and unlocking operations) will not be performed concurrently by two different threads.

Figure 10:
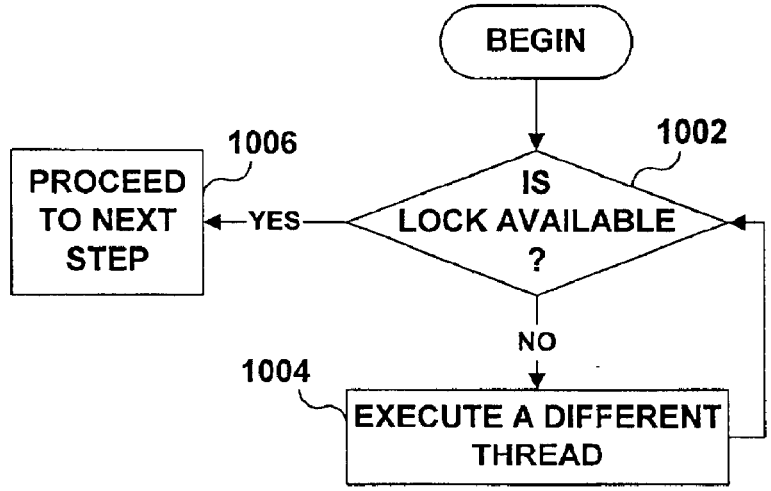
FIG. 10 is a flow diagram showing an exemplary lock acquisition process.

FIG. 10 shows how the various "acquire lock" steps are performed (i.e., steps 506 in FIG. 5, step 610 in FIG. 6, and step 706 in FIG. 7). FIG. 10 is essentially a detailed description of what happens at steps 506, 610, and 706. First, a determination is made as to whether the lock is available (step 1002). The lock is unavailable if another thread has acquired it but has not yet released it; otherwise, it is unavailable. If it is determined at step 1002 that the lock is available, then the thread proceeds at step 1006 to perform whatever is its next step after lock acquisition. For example, in the queuing procedure of FIG. 5, lock acquisition is performed at step 506, so if the lock is available then the process is permitted to proceed to the step following step 506 (i.e., step 508). On the other hand, if it is determined at step 1002 that the lock is unavailable, then execution switches to another thread for some amount of time (step 1004). Eventually, control returns to the thread that is waiting for the lock, where step 1002 is performed again in order to determine whether the lock has become available. The cycle of testing for the lock's availability (at step 1002) and executing another thread for some amount of time (at step 1004) is repeated until the lock eventually becomes available.

In the present invention, the use of the global lock is designed to prevent: (1) the destruction of a queue by a first thread (at step 618) while a second thread is queuing a request on that queue (at step 526); and (2) the simultaneous activation of two different queues (e.g., by steps 518–524 or steps 710–716) that could otherwise result in an active queue count that exceeds the concurrency.

For example, suppose that a first thread is executing the queuing procedure shown in FIG. 5, and a second thread is executing the "recall worker thread" shown in FIG. 6. If both threads could proceed concurrently without regard to each other (i.e., if the locking and unlocking steps in those procedures were not performed), then the situation might arise in which the first thread identifies a particular queue for queuing a new request (at step 508), and then the execution context switches to the second thread, which destroys that same queue at step 618. When control switches back to the first thread to place the request on the queue (at step 526), the queue would already have been destroyed, resulting in an error. However, the use of a global lock prevents the possibility of this error, because the second thread can never execute the queue destruction step (step 618), or even perform the final test for queue emptiness (step 612), while the first thread is performing steps 508 and 526, since those steps are protected by the same lock.

As another example, suppose that a first thread is executing the queuing procedure shown in FIG. 5, and a second thread is executing the queue activation procedure shown in FIG. 7. Suppose that the first thread has just created a new queue (at step 510) and added a new request to the new queue (at step 514). Moreover, suppose that the number of active queues is one less than the concurrency (i.e., there are sufficient drives available to active one additional queue). The first thread then proceeds to test whether the number of active queues is less than the concurrency (at step 514), and concludes that it can activate a new queue. If both the first and second threads could proceed concurrently without regard to each other, then it is possible that immediately after the first thread tests the value of the active queue counter (at step 514), the execution context would switch to the second thread, which would also test the value of the queue counter (at step 708). Since the first thread has not yet updated the active queue counter (at step 518), the second thread will also conclude that it can activate a new queue. In this situation, two threads will each proceed to activate a new queue, even though there are only sufficient resources to active one queue. This situation is prevented, however, by the use of the lock: since the first thread does not release the lock (step 520) until after it has incremented the active queue counter (step 518), the second thread will not reach the step of examining the active queue counter (at step 708) until the first thread has appropriately updated the counter (at step 518) and released the lock (at step 520).

Thus, the use of a lock, while not mandatory, is a useful way of preventing certain types of errors that could occur if two or more threads performed certain operations at the same time. However, other methods of synchronizing operations among concurrently executing threads, and such other methods may be used without departing from the spirit and scope of the invention.

Thus, referring back to FIG. 5 (in which the process of queuing a new request is described), it will be observed that the locking (at step 506) and unlocking (at steps 520 or 528) surrounds those steps that: (1) locate an appropriate queue and queue the new request thereon (steps 508, 510, 512, and 526); and (2) examine or manipulate the counter that maintains the number of active queues (steps 514 and 518). Similarly, in FIG. 7 (which describes the process of activating a queue), locking and unlocking surrounds the steps that examine or manipulate the active queue counter (steps 708 and 710). Furthermore, in FIG. 6, locking and unlocking surrounds the steps of: (1) testing whether the queue is empty (step 612); (2) decrementing the count of active queues (step 616); and (3) destroying a queue (618). By using a single global lock to lock all of these steps, the steps form a synchronous category of steps, where no two threads may concurrently perform steps falling into this category.

Performance Results on Test Data

The system embodying the invention was tested against a conventional recall algorithm. Specifically, files (ranging from 4 Kb to 1 Mb in size) were stored on a plurality of 4 mm tapes. A random series of 200 recall requests were generated for various taped files, with the total amount of requested data totaling approximately 13 Mb. The physical environment in which the tests were performed included a 2×200 MHz PENTIUM II processor system, a SCSI 9 GB hard drive, and 2 drive ADIC 4 mm tape changer. When the recalls were processed in a conventional manner (i.e., queuing all recall requests in the order received on a single queue, and without reading from plural drives concurrently), processing of the 200 recalls took 46 minutes and 37 seconds.

The test was then performed in the same physical environment, but using a method in accordance with the invention. Specifically, requests were placed on plural queues (i.e., one queue per medium, as shown in FIG. 3), requests were inserted into the queues such that the positions of the requested files on each queue formed up to two monotonically increasing sequences (as shown in FIGS. 8A–9), and recall was performed concurrently from both available drives (i.e., the concurrency was set to 2). When the same set of 200 recall requests, issued in the same order as in the first test, were processed in this manner, processing of the recalls took only 5 minutes and 7 seconds—an approximately nine-fold increase in throughput.

Exemplary File Management Environment

Figure 11:
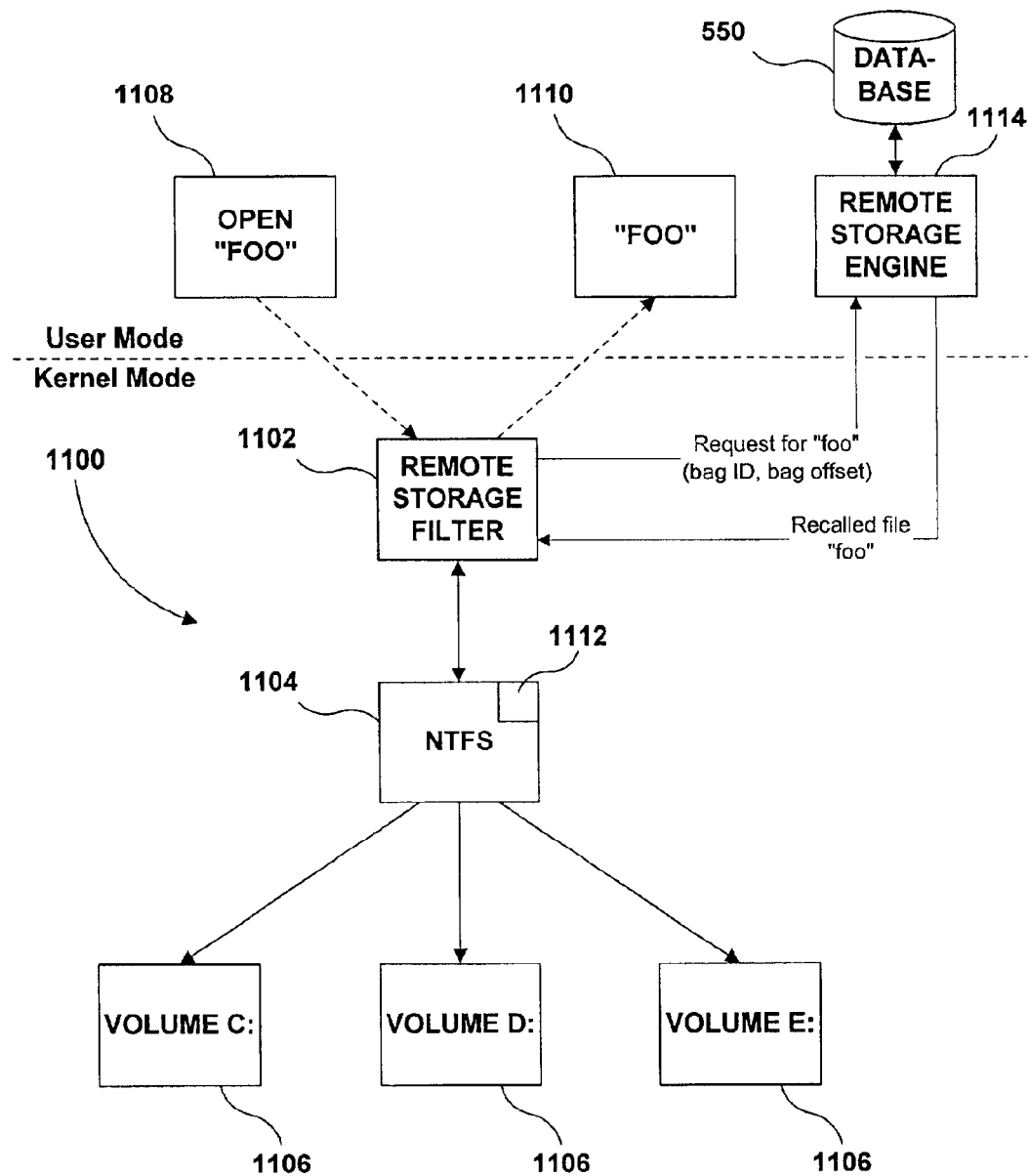
FIG. 11 is a block diagram of an exemplary file management environment in which the invention may be embodied.

While the present invention may be used in any context to recall data stored on media, a particularly useful environment in which the invention may be embodied is a file management environment which manages files, some of which have been "migrated" to backup media. FIG. 11 shows such an environment in which the invention may be incorporated.

Referring now to FIG. 11, a file management environment 1100 (which may be part of an operating system, such as operating system 134 shown in FIG. 1) comprises a remote storage filter 1102, a file system manager 1104 (of which NTFS, depicted in FIG. 11, is an example), and one or more volumes of files 1106. Volumes 1106 may, for example, be plural hard disks or separate partitions of a single hard disk. File management environment is organized in a hierarchy: requests and instructions are received by file management system from the user level by way of remote storage filter 1102. Remote storage filter 1102 receives requests for files (such as request 1108 to open a file called "foo," depicted in FIG. 11). Remote storage filter 1102 passes the request to file system 1104, which, in turn, locates the requested file on the appropriate volume 1106. File system 1104 includes data or logic that is able to identify the particular volume 1106 on which the requested file is stored. File system 1104 may then pass the file 1110 retrieved from volume 1106 back to user mode by way of RS filter 1102. The file is then made available in user mode.

File system 1104 may maintain a set of reparse points 1112. A reparse point is essentially a flag and a storage location for arbitrary data. When a request for a file is received (e.g., a request for the file "foo"), file system 1104 may check to determine whether a reparse point is set for that file. If there is no reparse point 1112 for the file, file system 1104 locates the file in volumes 1106. If a reparse point 1112 is set for the file, then file system 1104 indicates this fact back to remote storage filter 1102, along with whatever arbitrary data is associated with the particular reparse point. The indication that reparse point 1112 has been set serves as a flag to remote storage filter 1102 indicating that the requested file is not located in volumes 1106. The arbitrary data associated with reparse point 1112 may be a "stub" that indicates where the file is stored in remote storage—e.g., a media ID, a bag ID, and an offset. Specifically, the process of migrating files to remote storage may include the step of setting a reparse point and storing in the reparse point the remote location of the file. Remote storage filter 1102 then communicates with remote storage engine 1114, which receives the information identifying the location of the requested file, retrieves that file from media using a physical remote storage device (e.g., juke box 202) and provides that file back to remote storage filter 1102. Remote storage filter then takes the file received from remote storage engine 1114 and provides it to user mode. The process of hitting a reparse point 1112 and retrieving a file from remote storage in response thereto may, in fact, take place "transparently." That is, when a user issues a request 1108 for a file, the components of file management environment 1100 may act together "behind the scenes" such that the user is unaware of whether the file was received from volumes 1106 or from a remote storage medium (except, of course, that retrieval from remote storage may take a longer time).

Features of the present invention may be embodied in remote storage engine 1114. Generically, remote storage engine 1114 is a software component that contains logic which retrieves requested data from media using a physical remote storage device. Conventionally, remote storage engine 1114 may contain logic which queues requests sequentially (in a single queue) and processes the requests in the order received. In accordance with the invention, however, remote storage engine 1114 may be programmed with logic that retrieves requests according to the technique described above in connection with FIGS. 4A–9. That is, remote storage engine 1114 may perform the operations of creating and managing plural queues (one for each medium on which requested data objects are located), activating and destroying queues, storing a concurrency value and various counters, organizing the requests on each queue to form two monotonically increasing sequences, and all of the other techniques depicted in FIGS. 4A–9.

When aspects of the invention are embodied in remote storage engine 1114, requested files that have been migrated to media may be retrieved in the following manner. First a user issues a request to access file, such as "open foo" request 1108. This request is received by remote storage filter 1102, which passes the request to file system 1104. If the file "foo" has been migrated to media and is not located on volumes 1106, then a reparse point 1112 may have been set for the file. Thus, file system 1104 notifies remote storage filter 1102 that a reparse point 1112 has been set for the requested file, and also provides to remote storage filter 1102 the data that is stored with reparse point 1112. As noted above, this data stored with reparse point 1112 may include a "stub" indicating the file's location on media. Remote storage filter 1102 then issues a request for the file to remote storage engine 1114. This request is the request received at step 502 of FIG. 5. Remote storage engine 1114 then queues the request according to the process of FIG. 5, creating a new queue if necessary. It should be noted that database 550 (depicted in FIG. 5) may be accessible to remote storage engine 1114. Database 550 may be used to convert certain type of file identifying information (i.e., bag ID, and bag offset), into an absolute location for the file (i.e., a media ID and a media offset). Additionally, inasmuch as plural versions of the same file may have been migrated on different occasions, the information stored in database 550 may be used to ascertain which is the most recent version of the file (and thus the version that should be recalled). Remote storage engine 1114 then processes the requests by communicating with a physical remote storage device (e.g., a juke box) to retrieve "foo" (and possibly other files that have been requested) from media. When a file has been retrieved by remote storage engine 1114, it is provided back to remote storage filter 1102, which makes the file 1110 available in user mode.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method of recalling data objects stored on a plurality of media comprising:
   receiving a plurality of requests to recall data objects, each data object being located on a particular one of said plurality of media;
   creating a plurality of queues, wherein each one of said queues corresponds to one of said media;
   placing said requests on the created queues, wherein each request is placed on the queue corresponding to the medium on which the requested data object is located;
   activating a first of said queues, said first queue being associated with a first of said plurality of media; and
   retrieving, from said first medium, the data objects requested on the first queue,
   wherein each queued request indicates the offset from a predetermined location on a medium at which the requested data object is located, and wherein said placing act comprises:
      organizing the requests on each queue in a first and a second sequence, each sequence comprising a set of requests whose offsets are monotonically increasing within the respective sequence,
   and wherein the act of creating a plurality of queues comprises timestamping each of the created queues, and wherein the act of activating a first of said plurality of queues comprises selecting a queue to be activated based on the timestamps of the respective queues.

2. The method of claim 1, further comprising:
   activating a second of said queues, said second queue being associated with a second of said plurality of media, the second medium being different from said first medium; and
   retrieving, from said second medium, the data objects requested on the second queue, the retrieval occurring at least in part concurrently with the retrieval of data objects from the first medium.

3. The method of claim 1, wherein each of said queues comprises a linked list of requests.

4. The method of claim 1, further comprising querying a database to determine the locations of the requested data objects.

5. The method of claim 4, wherein the location provided by said database comprises a media identifier and an offset into the identified medium.

6. The method of claim 1, said method being performed in a multi-threaded environment wherein plural threads execute concurrently, said method further comprising:
   acquiring a lock prior to performing an action selected from the group consisting of:
      placing a request on a queue; and
      changing a queue from a non-active state to an active state; said lock being acquirable by only one of said threads at a given time; and
   releasing said lock subsequent to performing an action in said group.

7. The method of claim 1, wherein said method is performed in a computing environment comprising a hard disk, said method further comprising:
   determining that said data objects are not located on said hard disk.

8. A computer-readable medium having computer-executable instructions to perform the method of claim 1.

9. A method of scheduling requests to recall data objects from a medium, said medium being mounted on a drive, said drive having a reading head, said method comprising:
   receiving a new request to recall a data object from said medium, said data object being located at a first offset along said medium;
   identifying a queue, from among a plurality of queues wherein each of said queues comprises a plurality of requests to recall data from said medium, said requests having an order, each of said requests corresponding to a particular data object stored on said medium and indicating an offset into said medium at which the corresponding data object is located, said requests on each of said queues forming first and second sequences, said first sequence preceding said second sequence in each of said queues with respect to said order, wherein the offsets of the requests within said first sequence are a maximally monotonically increasing series;
   determining the location of said reading head along said medium;
   determining that the location of said reading head is beyond said first offset;
   inserting said new request into said queue into a position that, with respect to said order, is subsequent to said first sequence,
   wherein each of said plurality of queues is timestamped at the time each of the queues is created, and wherein one of said queues is selected to have its recall requests processed, the selection of said one of said queues being based on the respective timestamps of the plurality of queues.

10. The method of claim 9, wherein the offsets of the requests within each of said second sequences are a maximally monotonically increasing series.

11. The method of claim 10, wherein the position in said second sequence in said queue in which said new request is inserted is based on said first offset, such that the monotonically increasing nature of said second sequence is preserved following the insertion.

12. The method of claim 9, further comprising:
   selecting, from among said plurality of queues, a particular queue into which to insert said new request, wherein each one of said plurality of queues corresponds to a different medium, the selection being based on the particular medium on which the data object is located.

13. A computer-readable medium having computer-executable instructions to perform the method of claim 9.

14. A system for retrieving data objects from a plurality of media comprising:
   a queuing module which creates a plurality of queues corresponding to said plurality of media, said queuing module receiving requests to retrieve data objects from said plurality of media and queuing each of said requests on the queue corresponding to the medium on which the requested data object is located;
   an activation module which selects queues for activation and activates the selected queues; and
   a retrieval module which retrieves the items on one of the selected queues from the corresponding medium in the order in which the items are located on the queue, wherein said queuing module timestamps each queue at the time that the queue is created, and wherein said activation module selects a queue for activation based on the timestamps of the created queues, and wherein each requested data object is located at an offset into the medium on which the data object is located, and wherein said queuing module includes logic which maintains the requests on each of said plurality of queues in first and second sequences, the offsets of the data objects requested in each of said first and second sequences comprising a maximally monotonically increasing series.

15. The system of claim 14, further comprising:
   a hard disk;
   a file system which manages files on said hard disk, which stores information indicating which of said files have been migrated to said media, and which issues a request to said queuing module for requested files that have been migrated to said media.

16. The method of claim 1, wherein there is one queue for each of said media.

17. The method of claim 14, wherein there is one queue for each of the plurality of media.

18. The method of claim 16, wherein each of said media is capable of being mounted on any one of a plurality of drives, and wherein each medium corresponds to a particular one of the queues regardless of which drive the medium is mounted on.

19. The method of claim 17, wherein each of said media is capable of being mounted on any one of a plurality of drives, and wherein each medium corresponds to a particular one of the queues regardless of which drive the medium is mounted on.

20. The system of claim 14, wherein each of the queues corresponds to a particular one of the plurality of media, wherein each of the media is capable of being mounted on any one of a plurality of drives, and wherein each medium corresponds to a particular one of the queues regardless of which drive the medium is mounted on.

* * * * *